2,947,707

CATALYST REGENERATION

Preston A. Wells, Jr., 345 Locust Road, Winnetka, Ill.

No Drawing. Filed Jan. 3, 1956, Ser. No. 556,795

5 Claims. (Cl. 252—419)

This invention relates to catalyst regeneration and has for an object the provision of a process for regenerating a catalyst used in the vapor phase hydrogenation of furfural.

In patent application Serial No. 290,350, filed May 27, 1952, now Patent No. 2,754,304, issued July 10, 1956 by Samuel Swadesh, there is disclosed a catalyst which is particularly suitable for the production of furfuryl alcohol by the vapor phase hydrogenation of furfural. This catalyst contains essentially reduced copper promoted by a minor portion of sodium silicate. In accordance with the disclosure in that patent application, the catalyst is prepared by admixing copper oxide with between 5 and 20 percent by weight of sodium silicate, forming the resulting mixture into pellets and thereafter reducing the copper oxide to metallic copper by means of a heated stream of hydrogen gas. The catalyst has particular utility for the vapor phase reduction of furfural and when the hydrogenation conditions are properly controlled the conversion of furfural to furfuryl alcohol is well over 95 percent complete and is usually over 99 percent complete. However, it has been found that the catalyst to be effective should be periodically regenerated to remove carbonaceous deposits therefrom.

Accordingly, it is a further object of this invention to provide a process for regenerating a catalyst containing metallic copper and sodium silicate as a promoter.

A further object of this invention is the provision of a process for regenerating a copper-containing catalyst which may be readily carried out on a commercial scale basis without danger of destroying the activity of the catalyst.

Further and additional objects will appear from the following description and the accompanying claims.

In accordance with this invention it has been found that a catalyst containing essentially copper and sodium silicate may be regenerated to restore its initial activity if the regeneration procedure is carried out under carefully controlled conditions which are designed to prevent the catalyst from coming into contact with liquid water and under temperatures which are below the sintering temperature of metallic copper in the presence of the sodium silicate during that phase of the operation when metallic copper exists as such in the catalyst mass undergoing regeneration. Thus in accordance with this invention a dry hydrogenation catalyst consisting essentially of copper and sodium silicate having deposited thereon a carbonaceous residue is first heated with a dry inert gas to a temperature above 212° F. and preferably above about 220° F., said temperature, however, being well below the sintering temperature of the copper in the presence of the sodium silicate. After heating, a hot inert gas, such as superheated steam to which has been added air to provide an oxygen concentration not greater than about one and one-half percent by volume, is passed through the catalytic mass being regenerated. Inasmuch as the regeneration step involves exothermic reactions, it is necessary to introduce the oxygen-containing gas into the catalytic mass at a temperature that is somewhat less than the temperature desired in the material being regenerated. However, as the regeneration continues, the inlet temperature for the regenerating gas may be increased gradually or stepwise while the regeneration is being continued, but care must be taken that the temperature of the inlet gases is not initially at a point which will cause the catalytic mass to be heated by exothermic reactions and to a temperature above the sintering temperature of copper in the presence of sodium silicate. During this first phase of the regeneration procedure a portion of the carbonaceous residue is volatilized or burned off of the catalyst and the copper is substantially completely oxidized to copper oxide. After the copper oxide has been formed and substantially no metallic copper is left, then the temperature of the regenerating gases is raised in order to burn off the remainder of the carbonaceous material. After the oxidation has been completed, the catalyst may be activated by hydrogenating in accordance with the procedure set forth in said Swadesh application Serial No. 290,350 for the production of fresh catalytic material. If the foregoing procedure is followed, the catalyst may be regenerated an indefinite number of times without losing its initial activity in a process of hydrogenating furfural in the vapor phase to produce furfuryl alcohol.

Usually the catalyst comprehended by this invention is in the form of discrete pellets and it is important that the catalyst does not come into contact with water in the liquid state because the solubilizing effect of the water may destroy the catalytic activity of the material. Furthermore, it is important that during the regeneration step the metallic copper, while it exists as such, should not be sintered or the catalytic activity of the pellets would also be destroyed. By employing a regenerating gas which contains less than about 1½ percent by volume of oxygen and preferably between ½ and 1 percent by volume of oxygen, and by regulating the temperature of the regenerating gas as it is passed into contact with the catalyst undergoing regeneration it is possible to restore the catalyst to its initial activity after hydrogenation. This invention has particular utility where it is desired to regenerate large masses of pelleted catalytic material.

For a more complete understanding of this invention, reference will now be made to a specific example showing a procedure which is useful in regenerating a spent catalyst of the type disclosed in Swadesh application Serial No. 290,350: A 3000 pound charge of spent catalyst in the form of ⅛ inch pellets containing metallic copper and promoted with about 10 percent by weight of anhydrous sodium silicate and having a carbonaceous residue from a furfural hydrogenation reaction deposited thereon was introduced into a regeneration chamber 3 feet in diameter and 10 feet in height. After the chamber was closed, a hot inert gas such as flue gas was passed through the catalyst bed in order to heat the entire catalyst bed, thereby preventing the condensation of steam when steam was added in a subsequent step of the operation. The temperature of the hot flue gas introduced into the bottom of the chamber was about 400° F. and when the temperature of the effluent gas at the top of the chamber had reached about 250° F. the flue gas supply was turned off and steam at 400° F. was passed through the chamber at the rate of 1000 pounds per hour in order to heat the catalytic bed to about 400° F. throughout. After this temperature was reached in the bed, then 5 mol percent of air was added to the inlet steam. This provided a gas which contained about one volume percent of molecular oxygen. While maintaining the steam inlet temperature at about 400° F., the temperature within the catalyst bed due to the controlled oxidation therein gradually went up to about 550° F. which is well below the copper sintering temperature. After a short period the gas effluent temperature began to diminish and when it had dropped back to about 450° F. the temperature of the inlet steam still containing the stated amount of oxygen was heated to about 450° F. When this was done, the temperature of the effluent gas went up to about 600° F. due to the exothermic reaction within the catalyst bed and then began to drop back gradually. When it had dropped back to about 500° F., then the gas inlet temperature was raised to about 500° F. and the procedure was repeated in 50° F. increments as above outlined, care being taken not to permit the temperature of the catalyst bed to rise above the sintering point of copper in the presence of the sodium silicate. This temperature is in the neighborhood of 700° F. but of course may vary considerably depending upon the percentage of sodium silicate in the catalyst. After the catalyst bed had been brought up to the 700° F. temperature by the stepwise procedure above indicated, the metallic copper in the catalyst mass had been substantially completely oxidized to copper oxide. Thereafter it is safe to raise the temperature still further and this is done by heating the inlet regenerating gases still containing the stated amount of oxygen to around 650° to 700° F. but the maximum temperature of the effluent gas should not exceed about 800° F. At this stage in the operation the regenerating gases burn off all of the residual carbon and other carbonaceous material although it will be appreciated that much of the carbonaceous material or residue is removed in the earlier stages of the regeneration procedure.

In order to test whether regeneration has been completed, a stream of heated air is introduced directly into the catalyst bed and if the temperature of the bed does not rise to any substantial extent, then it may safely be assumed that the catalyst treatment is complete. Thereafter the catalyst bed is cooled and the pellets are subjected to hydrogenation essentially by the method disclosed in the Swadesh application whereby to condition them for further use as a hydrogenation catalyst. The regenerated catalyst has essentially the same activity as the initial catalyst and may be regenerated an indefinite number of times without destroying that activity if the conditions outlined above are carefully controlled.

While a particular embodiment of this invention is shown above, it will be understood, of course, that the invention is not to be limited thereto, since many modifications may be made, and it is contemplated, therefore, by the appended claims, to cover any such modifications as fall within the true spirit and scope of this invention.

I claim:
1. A process of regenerating a mass of catalyst pellets comprising copper and sodium silicate promoter having a carbonaceous residue deposited thereon which comprises passing a hot gas having less than about 1½ volume percent of molecular oxygen through said catalyst at a temperature in excess of about 220° F. but below the sintering temperature of copper until the copper has been substantially completely oxidized to copper oxide and thereafter increasing said temperature in said mass to above said sintering temperature but below about 800° F. while continuing to pass an oxygen-containing gas therethrough whereby to completely oxidize said carbonaceous residue and subsequently reducing the copper oxide to copper.

2. A process of regenerating a large mass of a pelleted furfural hydrogenating catalyst comprising essentially metallic copper and anhydrous sodium silicate promoter having a carbonaceous hydrogenation residue deposited thereon which comprises passing a hot gas essentially free of oxygen and steam through said mass until substantially all of said mass reaches a temperature in excess of about 220° F. but below the sintering temperature of copper therein, then passing a heated gas containing less than about 1½ volume percent of molecular oxygen through said mass under conditions whereby the temperature of said mass is increased stepwise but not exceeding said sintering temperature until said copper is substantially completely converted to copper oxide, and thereafter passing an oxygen-containing gas at a temperature above the temperature of the preceding step but below about 800° F. whereby completely to burn the carbonaceous residue from the catalyst and subsequently reducing the copper oxide to copper.

3. In a process of regenerating a furfural hydrogenation catalyst comprising copper, sodium silicate promoter and a carbonaceous hydrogenation residue, the steps of passing a regenerating gas having an oxygen content of between about ½ and 1½ volume percent through said catalyst over a period of time at gradually increasing temperatures within the range of about 220° F. and about 800° F., said temperatures being below the sintering temperature of the catalyst until the copper is converted to copper oxide, whereby all of the carbonaceous residue is burned from the catalyst and subsequently reducing the copper oxide to copper.

4. A process of regenerating a catalyst comprising copper and sodium silicate promoter having a carbonaceous residue deposited thereon which comprises passing a hot gas containing between about ½ and 1½ volume percent of molecular oxygen over said catalyst, said catalyst being maintained at a temperature below the sintering temperature of the catalyst and between about 220° and about 700° F. during the treatment with said gas whereby the copper is substantially completely oxidized to copper oxide and a portion of residue is oxidized and removed by said gas, and thereafter passing said gas over said catalyst while maintaining the temperature thereof between about 700° and about 800° F. whereby the balance of said carbonaceous residue is burned off said catalyst, and subsequently reducing the copper oxide to copper.

5. A process of regenerating a catalyst prepared by admixing copper oxide with between 5 and 20 percent by weight of sodium silicate promoter and subsequently reducing the copper oxide to metallic copper, the catalyst having carbonaceous residue deposited thereon, which process comprises passing a hot gas containing between about ½ and 1½ volume percent of molecular oxygen over said catalyst, said catalyst being maintained at a temperature below the sintering temperature of the catalyst and between about 220° and about 700° F. during the treatment with said gas whereby the copper is substantially completely oxidized to copper oxide and a portion of residue is oxidized and removed by said gas, and thereafter passing said gas over said catalyst while maintaining the temperature thereof between about 700° and about 800° F. whereby the balance of said carbonaceous residue is burned off said catalyst and subsequently reducing the copper oxide to copper.

References Cited in the file of this patent
UNITED STATES PATENTS

| 2,162,893 | Kuhl | June 20, 1939 |
| 2,273,297 | Szayna | Feb. 17, 1942 |
| 2,273,864 | Houdry | Feb. 24, 1942 |
| 2,457,556 | Heinemann et al. | Dec. 28, 1948 |
| 2,457,566 | Krieger et al. | Dec. 28, 1948 |
| 2,495,723 | Hormann | Jan. 31, 1950 |

OTHER REFERENCES

Catalysis, Berkman et al., Reinhold Pub. Corp., 1940, pp. 299–300.